Jan. 5, 1960      S. M. BUTLER      2,919,704
FILTER CLEANER
Filed Sept. 20, 1954
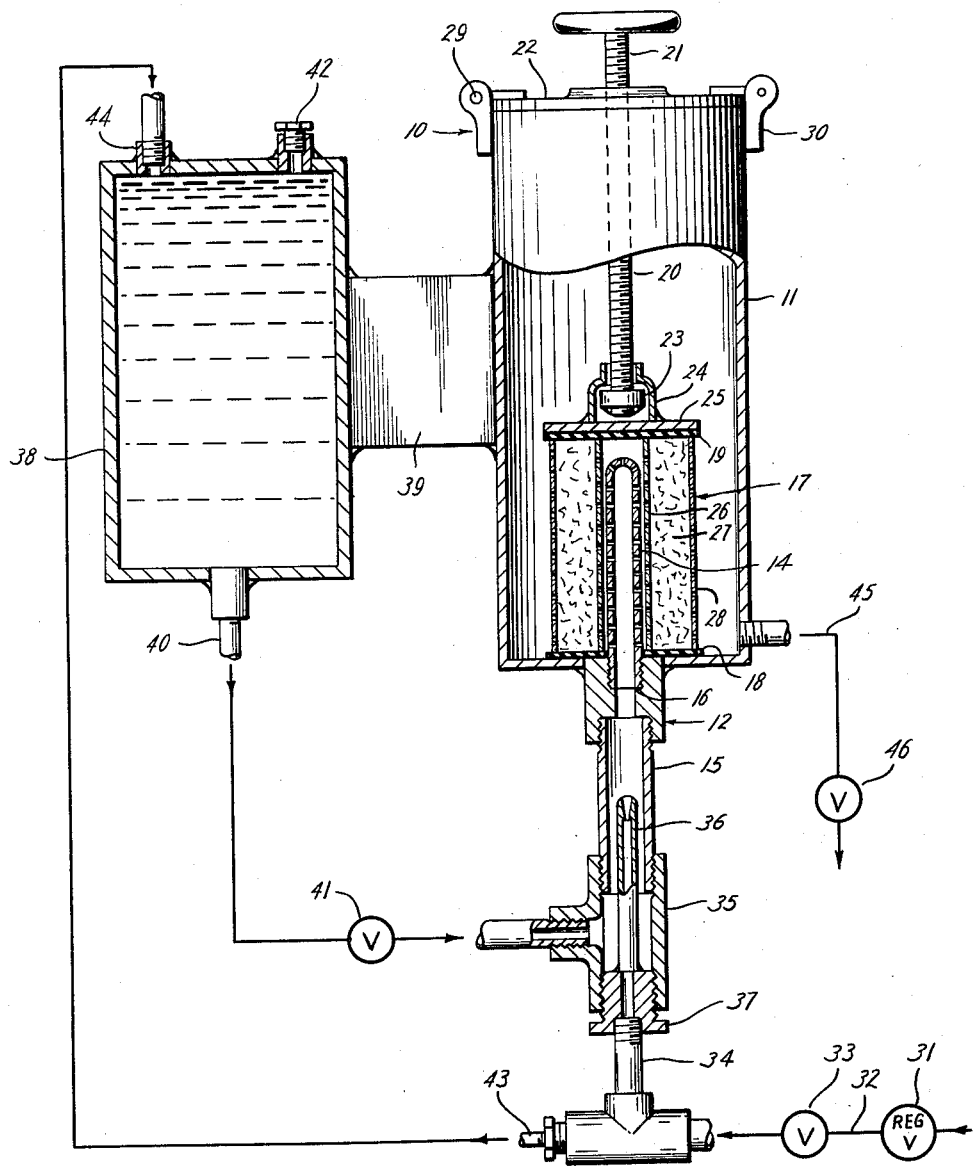
Stedman M. Butler
INVENTOR.
BY Wm. E. Ford
ATTORNEY

United States Patent Office 2,919,704
Patented Jan. 5, 1960

2,919,704

FILTER CLEANER

Stedman M. Butler, Houston, Tex.

Application September 20, 1954, Serial No. 456,970

2 Claims. (Cl. 134—102)

This invention relates to a filter cleaner and has particular adaptation to a structure for cleaning automobile filters and the like, which cleaning may be accomplished at a convenient time as at the time the oil in an automobile may be changed.

It is a particular object of this invention to provide a filter cleaner and method by which a filter may be easily and firmly clamped in a container and cleansed and dried therein by the injection of cleaning liquid and compressed air into the core of the filter and outwardly therethrough.

It is another object of this invention to provide a filter cleaner of this class in which the cleansing liquid is under compressed air pressure and in which the liquid is drawn from the liquid chamber by the force of jetted compressed air through a diffuser insertable into the core of a filter to be cleaned.

It is also an object of this invention to provide a filter cleaner of this class which is inexpensive of construction, easily operated and readily drained. It is also an object of this invention to provide a filter cleaner of this class in which the filter is easily and firmly clamped over the diffuser and easily removed from the cleaning compartment.

Other and further objects will be apparent when the specification hereinbelow is considered in connection with the drawing in which the figure is an elevational view of the invention, partly in section.

As shown in the drawing a filter cleaner 10 includes a cleaning compartment 11 which has a tubular connection 12 from which a pipe 15 extends downwardly. Such connection 12 has therein a tubular perforated diffuser 14 upstanding therefrom. The diffuser is threadably connected to the connection 12 at 16 and diffusers of various heights may be employed in accordance with the various heights of filters to be cleaned. A filter 17 is shown clamped in position in the cleaning compartment 11 and such filter fits upon a gasket 18 and has a gasket 19 on the top thereof where it is clamped by means of a clamping assembly 20. Such clamping assembly includes a threaded rod 21 which is threadable through the cover 22 of the compartment 11 and terminates in a ball surface providing member 23 which has therearound a reducer 24 which is closed by a plate 25 which sets upon the gasket 19 and clamps the filter in position as the rod 21 is threaded to lowermost position and the ball surface providing member 23 bears downwardly on the plate 25.

The filter is shown as including a central perforate core 26 which is surrounded outwardly by a filtering material 27 such as fibre glass or any other well known means of this type. Outwardly of the material 27 the wall 28 of the filter is also perforated.

The cover or lid 22 is hinged at 29 to the compartment 11 and is latched in closed position by means of the releasable latch 30. Thus to remove a filter which has been cleaned in a manner to be described hereinbelow, it is only necessary to release the latch 30 after first threading the rod 21 upwardly so that the member 23 engaged the reducer 24 to lift it from engagement with the filter 17. Then the cover 22 may be raised and turned backwardly on the hinge 29 so that the filter may be manually removed through the top of the compartment.

After the filter 17 is clamped in position a pressure regulating valve 31 in compressed air line 32 is adjusted to let compressed air pass therethrough at the desired pressure and a control valve in such line 32 is opened. The compressed air thus passes upwardly through a pipe 34 which is connected to the lower end of a T 35. A hollow tube 36 of smaller diameter than the pipe 34 is connected to the pipe by means of a bushing 37 at the junction of the pipe 34 and T 35.

A liquid tank or compartment 38 is provided adjacent the compartment 11 and may be connected thereto as by the gusset plate 39. A conduit 40 extends from the bottom of the tank 38 to the T 35, and such conduit 40 has therein a control valve 41. A filler plug 42 is provided in the top of the tank 38 and also a small pressure equalizing compressed air line 43 extends from the compressed air line 32 for connection into the top of the tank 38 at 44.

With the filter in position the operation of cleaning may be accomplished by opening the valves 33 and 41 and with the pressure regulating valve 31 adjusted to admit compressed air therethrough at desired pressure, the compressed air passes outwardly through the tube 36 which serves as a jet nozzle and creates a venturi effect which draws liquid in admixture with the air to pass outwardly through the diffuser 14 and the filtering material 27 and finally through the perforated filter well 28 to clean the filter of all dirt and filtered material which it may have picked up in usage, as in usage in automobiles. A drain line 45 is provided at the bottom of the compartment 11 and a control valve 46 is installed at the end of such line to be opened when it is desired to drain the soiled cleansing liquid therefrom after it has passed through the filter 17. Also the opening of the valve 46 will relieve any air pressure which may have been built up in the compartment 11.

When liquid from a tank 38 has been discharged upwardly and outwardly through the filter 17 for a sufficient length of time to clean the filter and the filtering material 27 the valve 41 may be closed while the valves 31 and 33 remain open and thus compressed air will continue to pass upwardly through the jet nozzle 36 and outwardly through the diffuser 14 to dispel all liquid from the filter 17 and its filtering material 27 so that the filter may be completely dried before it is removed from the compartment 11.

This invention is not limited to the structure and exact method hereinabove described but other structures and combinations of method steps also fall within the broad spirit of the invention and within the broad scope of interpretation claimed and merited for the appended claims.

What is claimed is:

1. A filter cleaner comprising a cleaning compartment having a closed bottom and a tubular perforate diffuser upstanding therewithin from the bottom thereof, means adapted to clamp a filter over said diffuser, a tubular connection with one end connected to said diffuser and with the other end extending below and exteriorly of said compartment, a substantially closed cleansing liquid tank separate from said compartment, means connecting said tank to communicate with said connection, a jet nozzle extending into said connection co-axially with said diffuser and directed to discharge thereinto, means to conjointly supply compressed air to said nozzle and to said liquid tank whereby said liquid is diffused through said filter to clean it, and a drain from the bottom of said cleaning compartment to drain off the filter soiled cleansing fluid.

2. A filter cleaner comprising a cleaning compartment having a closed bottom, a tubular perforate diffuser upstanding within said compartment, means adapted to clamp a filter over said diffuser, an exterior tubular connection connected to communicate with said diffuser, a substantially closed cleansing liquid tank separate from said compartment, means connecting said tank to communicate with said connection, a jet nozzle extending into said connection and directed to discharge into said diffuser, means to conjointly supply compressed air to said nozzle and to said liquid tank whereby said liquid is diffused through said filter to clean it, and a drain from the cleaning compartment to drain off the filter soiled cleansing fluid.

References Cited in the file of this patent

UNITED STATES PATENTS

| | | |
|---|---|---|
| 424,679 | Lascar | Apr. 1, 1890 |
| 781,692 | Stubbs | Feb. 7, 1905 |
| 1,768,314 | Folta | June 24, 1930 |
| 1,835,283 | Crickmer | Dec. 8, 1931 |
| 2,099,502 | Stockdale | Nov. 16, 1937 |
| 2,174,178 | Nichols | Sept. 26, 1939 |
| 2,190,305 | Auberschek | Feb. 13, 1940 |
| 2,194,607 | McDevitt | Mar. 26, 1940 |
| 2,338,586 | Keller | Jan. 4, 1944 |
| 2,475,407 | Sell | July 5, 1949 |
| 2,624,618 | Gelles | Jan. 6, 1953 |
| 2,726,667 | Wigmore | Dec. 13, 1955 |
| 2,745,418 | Balcom | May 15, 1956 |